(12) United States Patent
Yamanishi et al.

(10) Patent No.: US 10,103,565 B2
(45) Date of Patent: Oct. 16, 2018

(54) HANDHELD-TERMINAL CHARGING DEVICE

(71) Applicant: Panasonic Intellectual Property Management Co., Ltd., Osaka (JP)

(72) Inventors: Yuto Yamanishi, Kanagawa (JP); Ken Hatakeyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2 days.

(21) Appl. No.: 15/321,745

(22) PCT Filed: Jun. 30, 2015

(86) PCT No.: PCT/JP2015/003280
§ 371 (c)(1),
(2) Date: Dec. 22, 2016

(87) PCT Pub. No.: WO2016/002205
PCT Pub. Date: Jan. 7, 2016

(65) Prior Publication Data
US 2017/0141606 A1    May 18, 2017

(30) Foreign Application Priority Data

Jul. 2, 2014 (JP) ................. 2014-136525

(51) Int. Cl.
*H02J 7/00* (2006.01)
*H01F 27/42* (2006.01)
(Continued)

(52) U.S. Cl.
CPC .............. *H02J 7/025* (2013.01); *H01F 38/14* (2013.01); *H02J 7/0044* (2013.01); *H02J 50/10* (2016.02);
(Continued)

(58) Field of Classification Search
CPC ........................................ H02J 7/025
(Continued)

(56) References Cited

U.S. PATENT DOCUMENTS

| 2010/0259217 | A1 | 10/2010 | Baarman et al. |
| 2012/0313577 | A1* | 12/2012 | Moes ............ H02J 7/025 320/108 |

(Continued)

FOREIGN PATENT DOCUMENTS

| CN | 103280848 | 9/2013 |
| JP | 2009-205050 | 9/2009 |
| JP | 2012-523814 | 10/2012 |

OTHER PUBLICATIONS

International Search Report of PCT application No. PCT/JP2015/003280 dated Sep. 15, 2015.
(Continued)

*Primary Examiner* — Edward Tso
*Assistant Examiner* — Ahmed Omar
(74) *Attorney, Agent, or Firm* — Wenderoth, Lind & Ponack, L.L.P.

(57) ABSTRACT

This handheld-terminal charging device has a plurality of charging coils, a plurality of detection coils, and a control unit that is electrically connected to said charging coils and detection coils. The control unit drives the plurality of detection coils and watches for impedance changes that said detection coils detect when thus driven. If a detection coil detects an impedance change, a charging coil corresponding to said detection coil is selected from among the plurality of charging coils and a magnetic field is outputted from the selected charging coil. If a response signal that has been agreed upon with a handheld terminal is received in response to said magnetic field, the selected charging coil is used to charge said handheld terminal.

7 Claims, 7 Drawing Sheets

(51) Int. Cl.
  *H02J 7/02* (2016.01)
  *H01F 38/14* (2006.01)
  *H02J 50/90* (2016.01)
  *H02J 50/12* (2016.01)
  *H02J 50/10* (2016.01)
  *H04M 19/00* (2006.01)

(52) U.S. Cl.
  CPC .............. *H02J 50/12* (2016.02); *H02J 50/90* (2016.02); *H04M 19/00* (2013.01)

(58) Field of Classification Search
  USPC ........................................................ 320/108
  See application file for complete search history.

(56) References Cited

U.S. PATENT DOCUMENTS

2016/0134154 A1   5/2016  Baarman et al.
2017/0194809 A1*  7/2017  Partovi ................... H01F 5/003

OTHER PUBLICATIONS

Extended European Search Report dated Jun. 26, 2017 in corresponding European Application No. 15815681.0.

* cited by examiner

HANDHELD-TERMINAL CHARGING DEVICE

CROSS-REFERENCE TO RELATED APPLICATIONS

This application is a U.S. national stage application of the PCT International Application No. PCT/JP2015/003280 filed on Jun. 30, 2015, which claims the benefit of foreign priority of Japanese patent application No. 2014-136525 filed on Jul. 2, 2014, the contents all of which are incorporated herein by reference.

FIELD OF THE INVENTION

The present invention relates to a handheld-terminal charging device which charges a handheld-terminal such as a cellular phone, and a vehicle in which the handheld-terminal charging device is mounted.

DESCRIPTION OF THE RELATED ART

Handheld-terminals such as cellular phones have very high functions and consume larger power accordingly.

Hence, it is demanded that the handheld-terminals are charged everywhere including an inside of a vehicle. However, in recent years, handheld-terminal charging devices which enable so-called wireless charging without using cables tend to be gaining attention.

That is, such a charging device includes a support plate whose front surface side is a handheld-terminal placement portion, and charging coils which are disposed at a back surface side of the support plate to face to the support plate. When a handheld-terminal is placed on the handheld-terminal placement portion, magnetic fluxes from the charging coils can charge the handheld-terminal (a similar device is disclosed in, for example, PTL 1).

CITATION LIST

Patent Literature

PTL 1: Unexamined Japanese Patent Publication No. 2012-523814

SUMMARY OF THE INVENTION

The present invention provides a handheld-terminal charging device which reduces power loss and further suppresses a negative influence on other devices which use electromagnetic waves.

A handheld-terminal charging device according to one aspect of the present invention includes a plurality of charging coils, a plurality of detecting coils, and a controller which is electrically connected to these charging coils and these detecting coils. The controller drives the plurality of detecting coils, and monitors a change in an impedance detected by the plurality of detecting coils when the plurality of detecting coils is driven. Further, the controller selects a charging coil associated with a detecting coil which has detected the change in the impedance, from the plurality of charging coils, and causes the selected charging coil to output a magnetic field. The controller charges the handheld-terminal by using the selected charging coil when the controller receives a response signal determined between the handheld-terminal charging device and the handheld-terminal in response to the magnetic field.

Further, one aspect of the present invention is a vehicle in which the above handheld-terminal charging device is mounted.

The handheld-terminal charging device according to the present invention can reduce a ping operation when detecting a position of a handheld-terminal and, consequently, can reduce power loss and suppress an influence on other devices which use electromagnetic waves.

DETAILED DESCRIPTION OF THE PREFERRED EMBODIMENTS

Prior to description of exemplary embodiments of the present invention, a problem of a conventional handheld-terminal charging device (referred to as a charging device below) will be briefly described. A charging device described in PTL 1 adopts a multi-coil system. The multi-coil system uses only part of coils of a plurality of charging coils meeting positions at which the handheld-terminal is placed.

More specifically, according to PTL 1, each charging coil outputs a magnetic field (Ping) in a short time in order to detect that a secondary device (charging target) is placed on the charging device and detect a position of the secondary device. When the secondary device is placed on a charging surface, information of the secondary device is transmitted from the secondary device to the charging device in response to the ping. Further, communication is established when the charging device receives this information, and charging starts on a full scale. In this case, a coil having a high reception strength of the information transmitted from the secondary device is selected from a plurality of charging coils of the charging device, and is used to perform charging. Hence, only the charging coil meeting the position at which the secondary device is placed is used for full-scale charging.

However, according to this system, each charging coil repeats the ping at all times even when the secondary device is not placed on the charging device. Therefore, this system produces a magnetic field in air, and causes significant power loss.

Further, when it is assumed that the charging device is mounted in a vehicle, the magnetic field repeatedly produced by the ping is concerned to negatively influence other in-vehicle devices which use electromagnetic waves. For example, the magnetic field interferes a frequency band of an in-vehicle radio and deteriorates sound.

A handheld-terminal charging device according to the exemplary embodiments of the present invention, and a case where the handheld-terminal charging device is mounted in a vehicle will be described as an example with reference to the drawings.

First Exemplary Embodiment

Figure 1:
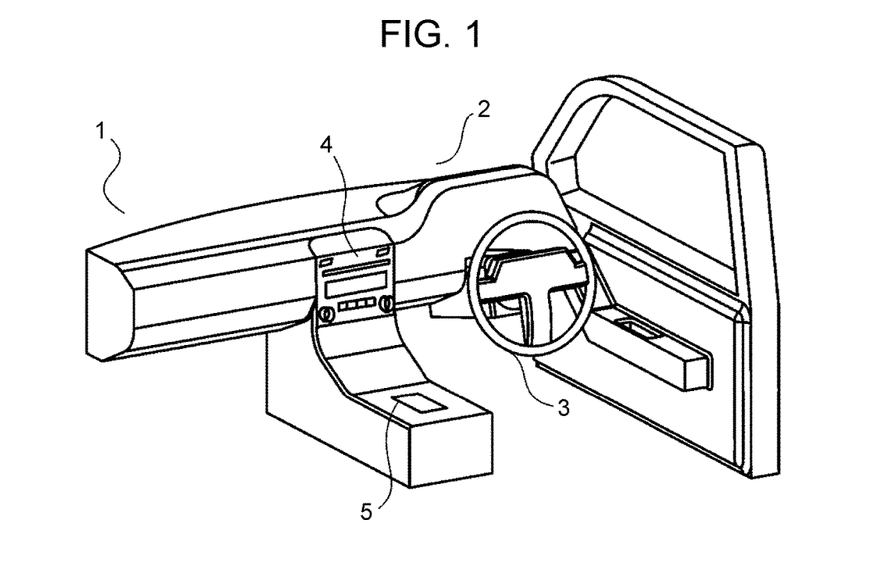
FIG. 1 is a perspective view illustrating a state where a handheld-terminal charging device according to a first exemplary embodiment of the present invention is disposed inside a vehicle.
Figure 2:
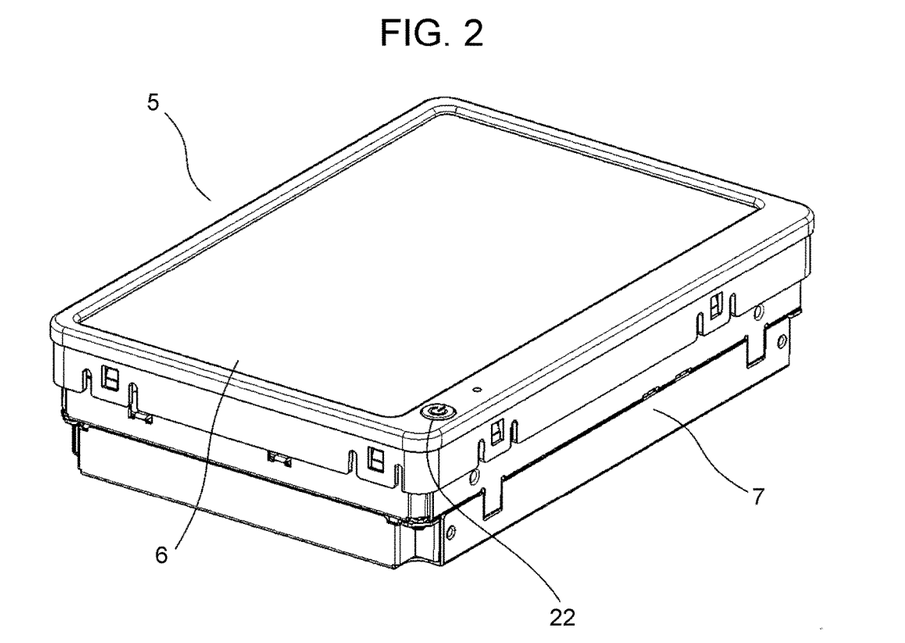
FIG. 2 is a perspective view of the handheld-terminal charging device illustrated in FIG. 1.
Figure 3:
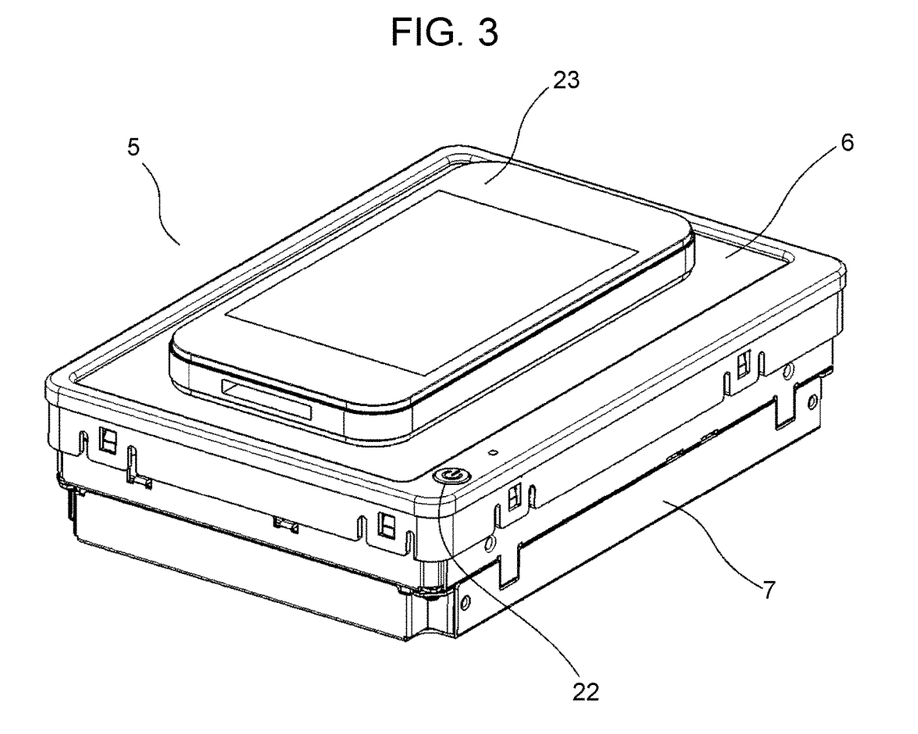
FIG. 3 is a perspective view illustrating a state where a handheld-terminal is placed on the mobile-terminal-charging device illustrated in FIG. 2.

FIG. 1 is a perspective view illustrating a state where handheld-terminal charging device 5 according to the first exemplary embodiment of the present invention is disposed inside vehicle interior 2 of a vehicle, FIG. 2 is a perspective view of handheld-terminal charging device 5, and FIG. 3 is a perspective view illustrating a state where handheld-terminal 23 is placed on handheld-terminal charging device 5.

In FIG. 1, handle 3 is installed at a front side of vehicle interior 2 of vehicle 1. Further, electronic device 4 which plays music or video images or shows car navigation video images is installed at a side of handle 3. Furthermore, handheld-terminal charging device 5 is installed at a rear side of electronic device 4 in vehicle interior 2.

As illustrated in FIG. 2, handheld-terminal charging device 5 includes box-shaped main body case 7 with support plate 6 disposed on an upper portion. As illustrated in FIG. 3, by placing handheld-terminal 23 on an upper surface (handheld-terminal placement portion) of support plate 6, it is possible to wirelessly charge handheld-terminal 23.

Figure 4:
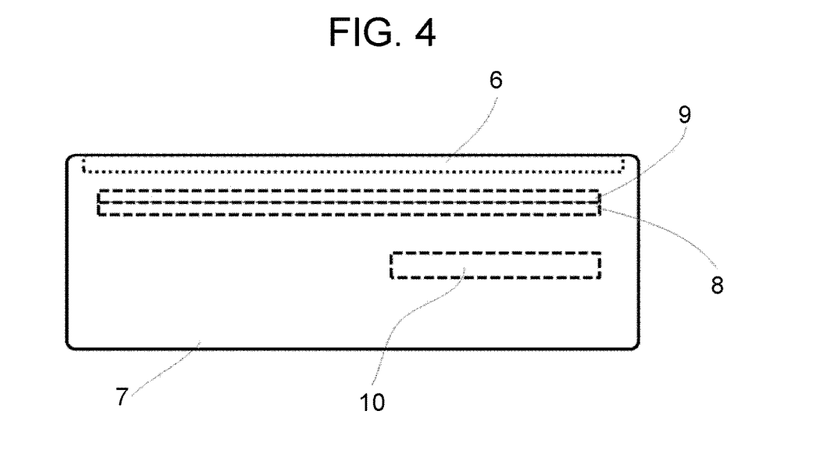
FIG. 4 is a perspective side view of the handheld-terminal charging device illustrated in FIG. 2.

Next, an inside of main body case 7 will be described in detail. FIG. 4 is a side view illustrating a perspective view of main body case 7. Inside main body case 7, charging coil substrate 8 on which a plurality of charging coils is formed, and detecting coil substrate 9 on which a plurality of detecting coils is formed are mounted. Further, controller 10 electrically connected to the charging coils and the detecting coils are mounted inside main body case 7.

Figure 5:
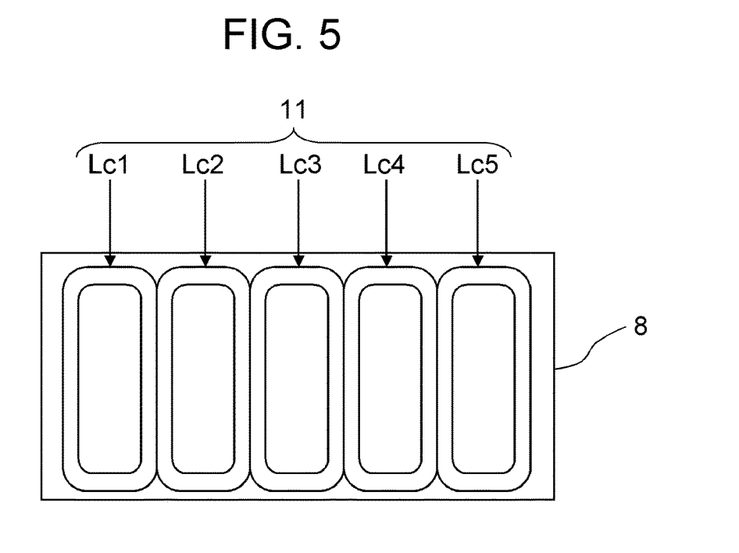
FIG. 5 is a view illustrating part of the handheld-terminal charging device illustrated in FIG. 2.
Figure 6:
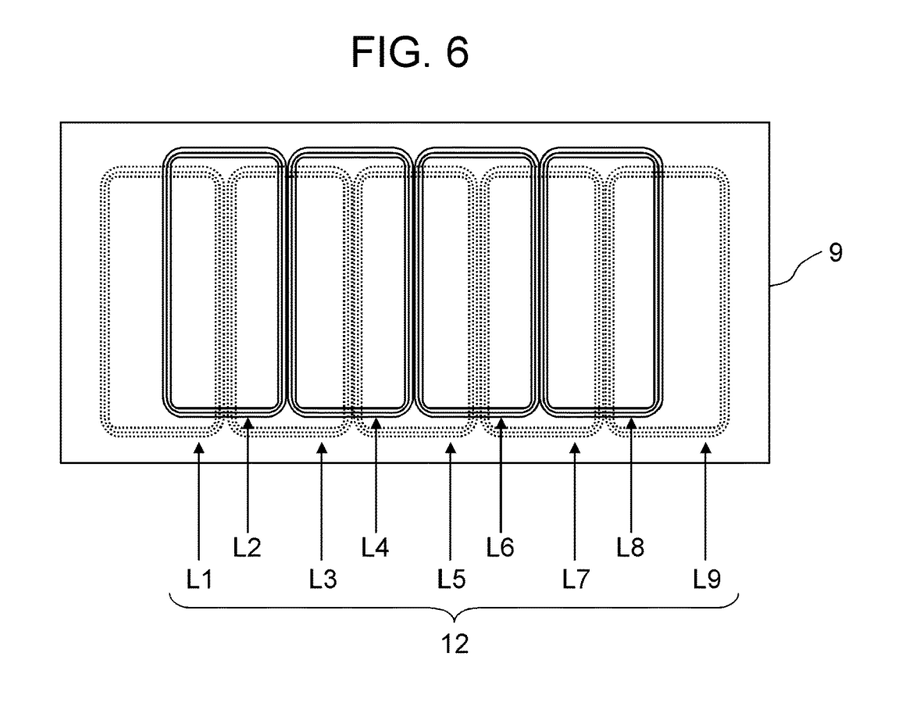
FIG. 6 is a view illustrating another part of the handheld-terminal charging device illustrated in FIG. 2.

FIGS. 5 and 6 are views illustrating charging coil substrate 8 and detecting coil substrate 9 which are part of handheld-terminal charging device 5.

As illustrated in FIG. 5, a plurality of charging coils 11 are formed on charging coil substrate 8. In the present exemplary embodiment, five charging coils Lc1 to Lc5 are provided. Each charging coil is formed by spirally winding a metal wire.

As illustrated in FIG. 6, a plurality of detecting coils 12 are formed on detecting coil substrate 9. A plurality of detecting coils 12 include five detecting coils L1, L3, L5, L7, L9 of a first set formed on a lower surface of detecting coil substrate 9 (a surface facing a bottom plate of main body case 7), and four detecting coils L2, L4, L6, L8 of a second set formed on an upper surface of detecting coil substrate 9 (a surface facing support plate 6). A plurality of detecting coils 12 are disposed to overlap when seen from a plan view such that ends of the detecting coils of the first set in an alignment direction and centers of the detecting coils of the second set in the alignment direction are collinearly positioned. In addition, in FIG. 6, the detecting coils of the first set are shifted from the detecting coils of the second set in a lower direction in FIG. 6 for ease of description. Actually, when seen from a plan view, midpoints of long sides of the detecting coils of the first set and midpoints of long sides of the detecting coils of the second set are collinearly disposed.

Figure 7:
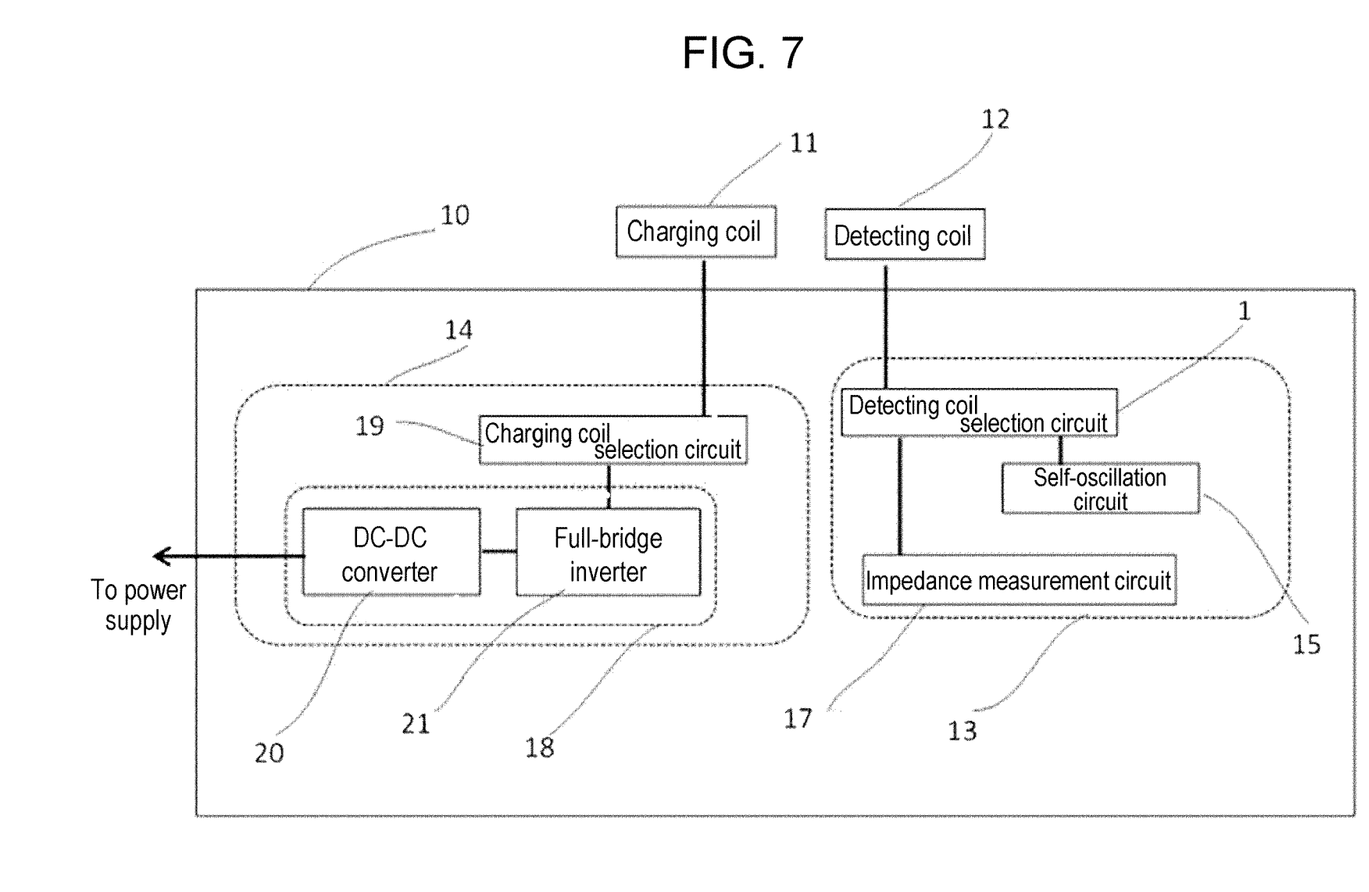
FIG. 7 is a control block diagram of the handheld-terminal charging device illustrated in FIG. 2.

FIG. 7 is a control block diagram of handheld-terminal charging device 5, and illustrates details of controller 10. Controller 10 includes detecting coil driver 13 and charging coil driver 14. Detecting coil driver 13 includes self-oscillation circuit 15, detecting coil selection circuit 16 and impedance measurement circuit 17. Impedance measurement circuit 17 monitors a change in an impedance of each of a plurality of detecting coils 12. Detecting coil selection circuit 16 selectively connects each of a plurality of detecting coils 12, and self-oscillation circuit 15 and impedance measurement circuit 17.

Meanwhile, charging coil driver 14 includes charging circuit 18 and charging coil selection circuit 19. Charging coil selection circuit 19 selectively connects each of a plurality of charging coils 11 and charging circuit 18. Charging circuit 18 converts direct-current power from an in-vehicle power supply (battery) into alternating-current power of an appropriate amplitude and frequency to supply to charging coils 11. More specifically, charging circuit 18 includes DC-DC converter 20 and full-bridge inverter 21.

A threshold for determining changes in impedances of detecting coils 12 described below is stored in a memory (not illustrated) built in controller 10.

Figure 8:
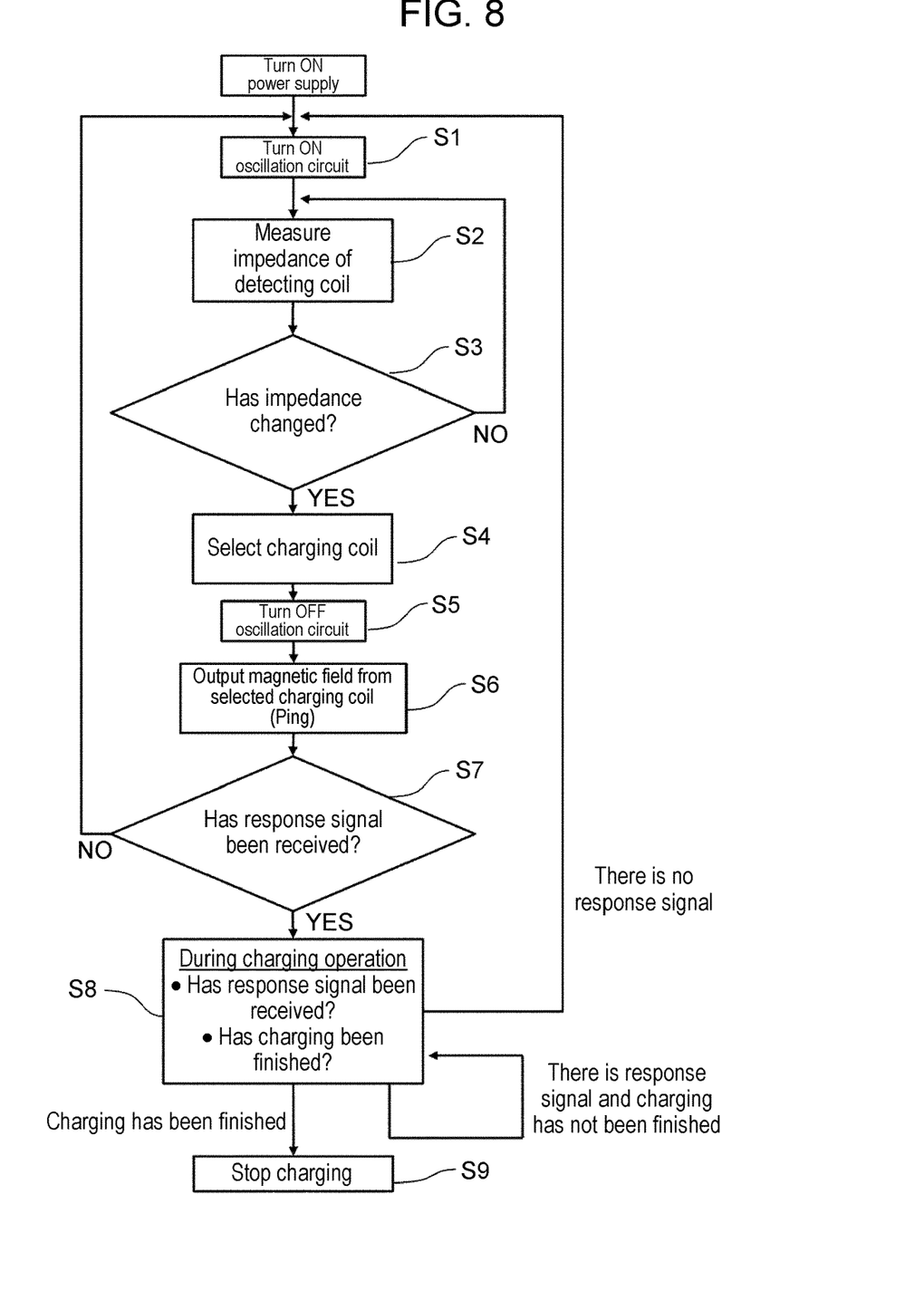
FIG. 8 is an operation flowchart of the handheld-terminal charging device illustrated in FIG. 2.

Next, an operation of the handheld-terminal charging device according to the present exemplary embodiment will be described with reference to FIG. 8.

When power switch 22 illustrated in FIG. 2 is pushed and the power supply is turned on, controller 10 detects whether or not handheld-terminal 23 has been placed on the upper surface (handheld-terminal placement portion) of support plate 6, and detects a position at which handheld-terminal 23 has been placed (more precisely, a position of power receiving coil inside the handheld-terminal). More specifically, self-oscillation circuit 15 is turned on, and outputs pulse waves to a plurality of detecting coils 12 (S1). In this case, impedance measurement circuit 17 sequentially measures an impedance of each of a plurality of detecting coils 12 (S2). Further, impedance measurement circuit 17 monitors in which detecting coil of a plurality of detecting coils 12 the impedance has changed (S3). In addition, a magnetic field transmitted from each detecting coil outputs a very small output voltage compared to a magnetic field output during a ping operation described below, and therefore has little influence on other in-vehicle devices which use electromagnetic waves. For example, an oscillation voltage of each detecting coil is 3.3 V, and an output voltage of the ping operation is 10 V or more. When the handheld-terminal is placed on the upper surface of support plate 6, a value of an impedance measured by a detecting coil meeting a position of the power receiving coil increases compared to a case where handheld-terminal 23 is not placed on the upper surface. Hence, controller 10 can estimate the position at which handheld-terminal 23 has been placed according to in which detecting coil of a plurality of detecting coils 12 the impedance has changed. Controller 10 cannot actually determine at this point of time whether or not an object placed on the upper surface of support plate 6 is a chargeable handheld-terminal, and detects that some metal object has been placed and detects a position of this metal object. For a first time after communication with the object is established in S7 described below, controller 10 determines that this object is the chargeable handheld-terminal, and starts a charging operation. When the communication is not established in S7, controller 10 determines that this object is not the handheld-terminal but a metal foreign object such as a coin, and does not start the charging operation.

In S3, as an example of a method for monitoring a change in an impedance, impedance measurement circuit 17 measures a resonance frequency of each of detecting coils 12, a resonance voltage or both of the resonance frequency and the resonance voltage to compare with the threshold stored in the memory. The threshold is set to a value of the resonance frequency or the resonance voltage at a normal level in a case where handheld-terminal 23 is not placed. When one or both of the resonance frequency and the resonance voltage change in one of a plurality of detecting coils 12, a change in an impedance is detected. More specifically, a change in the resonance voltage reflects a resistance component (R component) of the change in the impedance, and the resonance frequency reflects a reactance component (L component) of the change in the impedance. When a metal object is placed on the upper surface of support plate 6, the resonance frequency increases, and the resonance voltage lowers.

In a case where the change in the impedance has been detected in S3, processing moves to S4. In a case where the change in the impedance has not been detected, the processing returns to S2 again to measure impedances of detecting coils 12 again.

In S4 to S7, controller 10 checks whether or not the object placed on the upper surface of support plate 6 is a chargeable handheld-terminal. More specifically, controller 10 selects a charging coil associated with a detecting coil which has detected the change in the impedance, from a plurality of charging coils 11 (S4), and causes the selected charging coil to output an magnetic field (S6). In addition, before the charging coil outputs the magnetic field, self-oscillation circuit 15 is turned off once (S5).

Next, controller 10 checks whether or not a response signal determined between the handheld-terminal charging device and the handheld-terminal has been obtained in response to the output of the magnetic field from the selected charging coil (S7). In a case where the predetermined response signal has been obtained in S7, controller 10 determines that communication with handheld-terminal 23 has been established, and starts charging operation on a full scale (S8). In a case where the predetermined response signal has not been obtained in S7, controller 10 determines that the communication is not established, and the processing returns to S1 again.

In this case, an operation of outputting a magnetic field in a short time until whether or not there is a response from handheld-terminal 23 is determined is referred to as a ping operation.

In this regard, an operation performed by handheld-terminal 23 in a period during which handheld-terminal charging device 5 performs the operation in S4 to S7 will be described. Handheld-terminal 23 returns the predetermined response signal to handheld-terminal charging device 5 in response to reception of the magnetic field output from the charging coil of handheld-terminal charging device 5. In this case, handheld-terminal 23 fluctuates a value of a load connected with the power receiving coil. When a signal reception circuit connected to the charging coil of handheld-terminal charging device 5 detects a reflected impedance of this load fluctuation, the response signal is received. Such a signal transmitting and receiving method will be referred to as load modulation. The response signal returned from handheld-terminal 23 may be a simple signal only indicating that communication has been established, or may include ID information indicating such as a type of handheld-terminal 23.

The operation of handheld-terminal charging device 5 will be described again. During the charging operation (S8), controller 10 monitors whether or not the communication with handheld-terminal 23 continues, and continues charging if the communication continues. When the communication is cut off, the processing returns to S1 to check again whether or not there is the handheld-terminal. Further, during the charging operation (S8), controller 10 monitors whether or not a signal indicating that charging is finished has been transmitted from handheld-terminal 23, continues the charging in a case where the charging has not been finished, and stops the charging in a case where the charging has been finished (S9).

Next, how the charging coil to be selected in S4 is determined based on a result of the change in the impedance detected in above S3 will be described.

Figure 9:
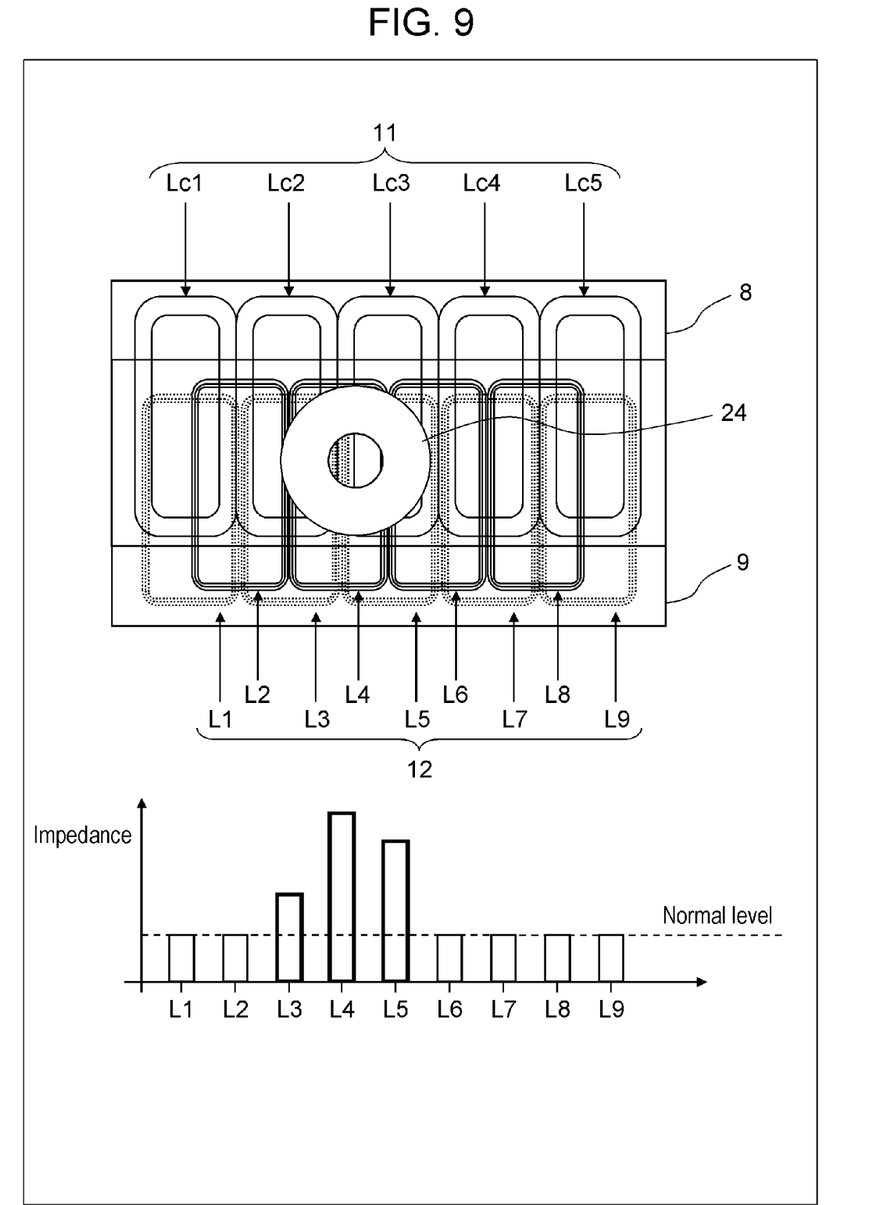
FIG. 9 is a view illustrating a structure and an operation example of the handheld-terminal charging device illustrated in FIG. 2.

FIG. 9 is a view for describing an example of a positional relationship between charging coils 11 and detecting coils 12 in handheld-terminal charging device 5, and a change in an impedance detected by each detecting coil when power receiving coil 24 is placed on detecting coil 12. In FIG. 9, detecting coil substrate 9 is shifted from charging coil substrate 8 in a lower direction in FIG. 9 for ease of description. Further, similar to FIG. 6, detecting coils L1, L3, L5, L7, L9 are shifted from detecting coils L2, L4, L6, L8 in the lower direction in FIG. 9. Actually, when seen from a plan view, midpoints of long sides of the charging coils and midpoints of long sides of the detecting coils are collinearly disposed.

In the present exemplary embodiment, some detecting coils 12 are disposed substantially right above charging coils 11, and some detecting coils 12 are disposed across the two neighboring charging coils.

In the present exemplary embodiment, the center of each detecting coil of detecting coils L1, L3, L5, L7, L9 in the alignment direction, and the center of each charging coil in the alignment direction are substantially collinearly positioned. Hence, each of detecting coils L1, L3, L5, L7, L9 is disposed substantially right above each of the associated charging coils. Meanwhile, the center of each detecting coil of detecting coils L2, L4, L6, L8 in the alignment direction, and the end of each charging coil in the alignment direction overlap. Hence, detecting coils L2, L4, L6, L8 are disposed across the two neighboring charging coils.

In addition, in case of such a layout, a width of each detecting coil is preferably half or more of a width of each charging coil. When the width of each detecting coil is smaller than the half of the width of each charging coil, gaps are generated between the detecting coils. Further, a length of each detecting coil is preferably substantially the same as a length of each charging coil. According to this configuration, the detecting coils can uniformly cover a roughly entire area of the charging coils. In addition, in the above description, the "width" means the length of each coil in the alignment direction, and the "length" means the length in a direction vertical to the "width".

Impedance measurement circuit 17 determines which detecting coil of a plurality of detecting coils 12 has detected a maximum change in an impedance. In a case where one of above detecting coils L1, L3, L5, L7, L9 has detected the maximum change in the impedance, controller 10 selects a charging coil right below the detecting coil which has detected the maximum change in the impedance as the associated charging coil.

Meanwhile, in a case where one of detecting coils L2, L4, L6, L8 has detected the maximum change in the impedance, controller 10 determines that power receiving coil 24 of handheld-terminal 23 has been placed across the two charging coils. Further, controller 10 refers to changes in impedances of both left and right neighboring detecting coils of the detecting coil (both sides of the detecting coil in the alignment direction) which has detected the maximum change in the impedance, too. Next, controller 10 compares the changes of levels in the impedances detected by these both left and right detecting coils. In an example in FIG. 9, detecting coil L4 has detected the maximum change in the impedance, and therefore controller 10 refers to changes in impedances of left and right detecting coils L3 and L5. In the example in FIG. 9, the change in the impedance detected by right detecting coil L5 is larger. Based on this result, controller 10 determines that power receiving coil 24 of handheld-terminal 23 is displaced to a right side (close to detecting coil L5) from the center of detecting coil L4, and selects charging coil Lc3 on the right side (close to detecting coil L5) from two charging coils Lc2 and Lc3 across which detecting coil L4 is disposed.

Thus, an optimal charging coil meeting a position of placed power receiving coil 24 is selected.

Second Exemplary Embodiment

Figure 10:
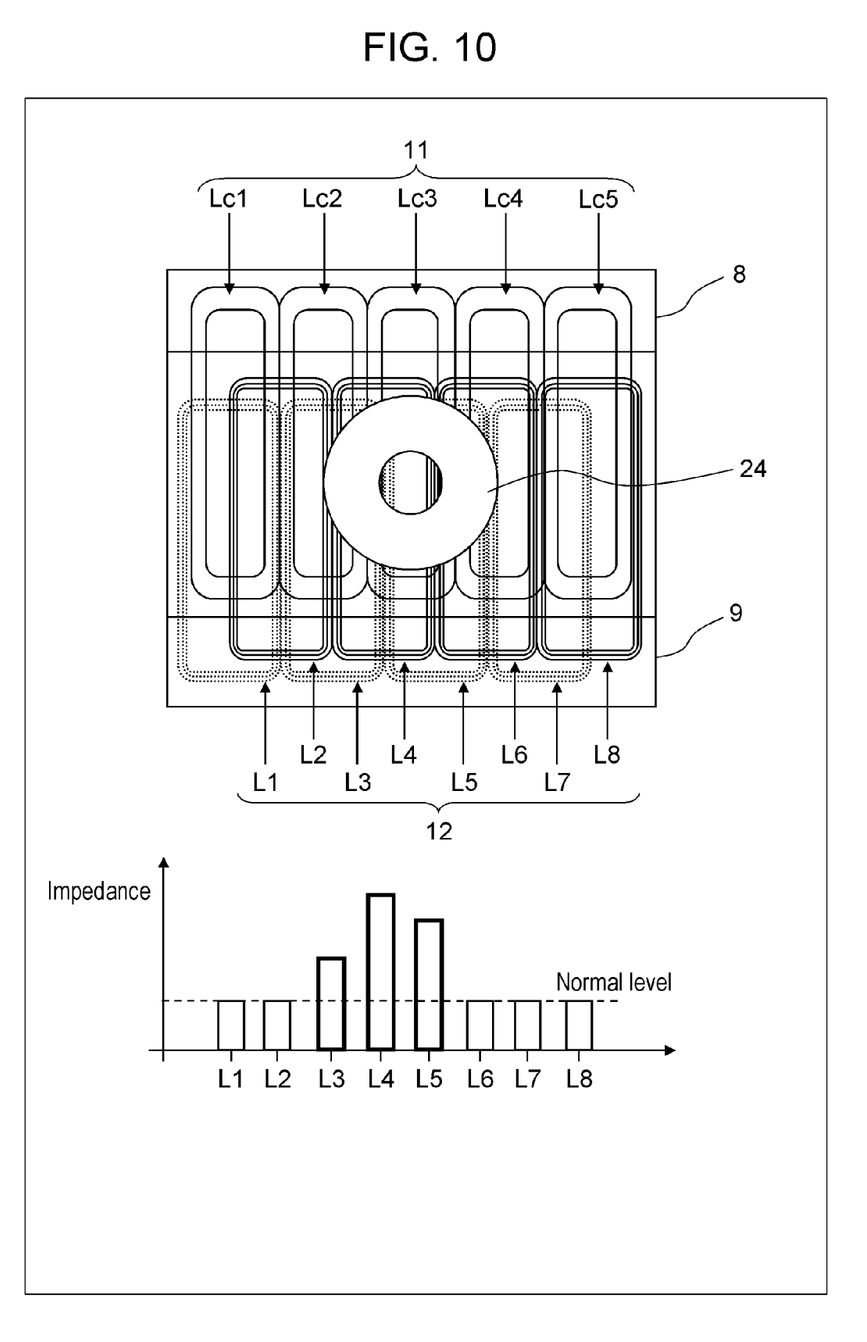
FIG. 10 is a view illustrating a structure and an operation example of a handheld-terminal charging device according to a second exemplary embodiment of the present invention.

FIG. 10 is a view for describing an example of a positional relationship between charging coils 11 and detecting coils 12 in handheld-terminal charging device according to the second exemplary embodiment of the present invention, and a change in an impedance detected by each detecting coil when power receiving coil 24 is placed on detecting coil 12.

The present exemplary embodiment differs from the first exemplary embodiment in a number of detecting coils 12 and the positional relationship between charging coils 11 and detecting coils 12. In the first exemplary embodiment, each of detecting coils to which an odd number is assigned, i.e., each detecting coil which is formed on a lower surface of detecting coil substrate 9 (a surface facing a bottom plate of main body case 7) is disposed right above each of charging coils 11 to configure the detecting coils of a first set. Meanwhile, each of detecting coils to which an even number is assigned, i.e., each detecting coil which is formed on an upper surface of detecting coil substrate 9 (a surface facing support plate 6) is disposed across two neighboring charging coils to configure the detecting coils of a second set. The present exemplary embodiment differs from the first exemplary embodiment in a layout of charging coils 11 and detecting coils 12. The other configurations are the same as configurations in the first exemplary embodiment.

In the present exemplary embodiment, a center of each detecting coil of detecting coils L1, L3, L6, L8 in the alignment direction, and a center of each associated charging coil in the alignment direction are substantially collinearly positioned. That is, each of detecting coils L1, L3, L6, L8 is disposed substantially right above each of the associated charging coils. These four detecting coils are detecting coils of the first set. Meanwhile, a center of each detecting coil of detecting coils L2, L4, L5, L7 in the alignment direction overlaps with an end of each associated charging coil in the alignment direction. That is, detecting coils L2, L4, L5, L7 are disposed across the two neighboring charging coils. These four detecting coils are detecting coils of the second set. In addition, there is no detecting coil positioned right above charging coil Lc3.

An operation in the second exemplary embodiment is as follows. First, in a case where one of the detecting coils (L1, L3, L6, L8) of the first set has detected a maximum change in an impedance, a charging coil right below the detecting coil which has detected the maximum change in the impedance is selected as the associated charging coil.

Meanwhile, in a case where one of the detecting coils (L2, L4, L5, L7) of the second set has detected the maximum change in the impedance, controller 10 determines that power receiving coil 24 of handheld-terminal 23 has been placed across the two charging coils. Further, controller 10 refers to changes in impedances of both left and right neighboring detecting coils of the detecting coil (both sides of the detecting coil in the alignment direction) which has detected the maximum change in the impedance, too. Next, controller 10 compares the changes in the impedances detected by these both left and right detecting coils. In an example in FIG. 10, detecting coil L4 has detected the maximum change in the impedance, and therefore controller 10 refers to changes in impedances of left and right detecting coils L3 and L5. In the example in FIG. 10, the change in the impedance detected by right detecting coil L5 is larger. Based on this result, controller 10 determines that power receiving coil 24 of handheld-terminal 23 is displaced to a right side (close to detecting coil L5) from the center of detecting coil L4, and selects charging coil Lc3 on the right side (close to detecting coil L5) from two charging coils Lc2 and Lc3 across which detecting coil L4 is disposed.

Thus, an optimal charging coil meeting a position of placed power receiving coil 24 is selected.

As described above, the detecting coils disposed substantially right above the charging coils are the detecting coils of the first set. Further, the detecting coils disposed across the two neighboring charging coils are the detecting coils of the second set. According to such an association, i.e., in which set of a detecting coil detects a maximum change in an impedance, an operation of controller 10 is determined. As in the present exemplary embodiment, the detecting coils belonging to the same set may be formed separately on a front surface and a back surface of detecting coil substrate 9.

As described above, the handheld-terminal charging device according to the present invention can reduce power loss and suppress an influence on other devices which use electromagnetic waves. Consequently, it is possible to reduce an influence on an in-vehicle radio particularly when the handheld-terminal charging device is disposed in a vehicle interior of a vehicle. The handheld-terminal charging device is useful as an in-vehicle charging device.

The invention claimed is:

1. A handheld-terminal charging device which wirelessly feeds charging power to a handheld-terminal, the handheld-terminal charging device comprising:
   a plurality of charging coils;
   a plurality of detecting coils; and
   a controller which is electrically connected to the plurality of charging coils and the plurality of detecting coils, wherein
   the plurality of charging coils is disposed under the plurality of detecting coils, and
   the controller is configured to:
   control output of pulse waves to the plurality of detecting coils to drive the plurality of detecting coils,
   monitor a change in an impedance detected by the plurality of detecting coils when the plurality of detecting coils is driven, select a charging coil associated with a detecting coil which has detected the change in the impedance, from the plurality of charging coils, and control the selected charging coil to output a magnetic field by a ping operation, the magnetic field being larger than a magnetic field generated by the plurality of detecting coils as a result of the pulse waves, and charge the handheld-terminal by using the selected charging coil when the controller receives a response signal determined between the handheld-terminal charging device and the handheld-terminal in response to the magnetic field.

2. The handheld-terminal charging device according to claim 1, wherein a width of each of the plurality of detecting coils in an alignment direction of the plurality of detecting coils is half or more of a width of each of the plurality of charging coils in an alignment direction of the plurality of charging coils.

3. The handheld-terminal charging device according to claim 1, wherein the plurality of detecting coils is configured of a first set and a second set, and an end of each detecting coil belonging to the first set in an alignment direction of detecting coils belonging to the first set, and a center of each detecting coil belonging to the second set in an alignment direction of detecting coils belonging to the second set are collinearly positioned from a plan view.

4. The handheld-terminal charging device according to claim 1, wherein the plurality of detecting coils is configured of a first set and a second set, a center of each detecting coil belonging to the first set in an alignment direction of detecting coils belonging to the first set, and a center of one of the plurality of charging coils in the alignment direction of the plurality of charging coils are collinearly positioned from a plan view, and a center of each detecting coil belonging to the second set in an alignment direction of detecting coils belonging to the second set, and an end of one of the plurality of charging coils in the alignment direction of the plurality of charging coils overlap from a plan view.

5. The handheld-terminal charging device according to claim 4, wherein, in a case where one of the detecting coils belonging to the first set has detected a maximum change in an impedance, the controller selects a charging coil positioned right below the detecting coil which has detected the maximum change in the impedance.

6. The handheld-terminal charging device according to claim 4, wherein, in a case where one of the detecting coils belonging to the second set has detected a maximum change in an impedance, the controller refers to changes in impedances of both neighboring detecting coils of the detecting coil which has detected the maximum change in the impedance, and selects a charging coil positioned right below of one of the both neighboring detecting coils having detected a larger change in the impedance.

7. The handheld-terminal charging device according to claim 1, wherein, in a case where the controller has not received the response signal determined between the handheld-terminal charging device and the handheld-terminal in response to the magnetic field transmitted from the charging coils, the controller monitors the change in the impedance detected by the plurality of detecting coils again.

* * * * *